(12) United States Patent
Souissi

(10) Patent No.: US 6,829,481 B2
(45) Date of Patent: Dec. 7, 2004

(54) SYSTEMS AND METHODS FOR INTELLIGENT INTER-SYSTEM HANDOFF

(75) Inventor: Slim S. Souissi, San Diego, CA (US)

(73) Assignee: Novatel Wireless, Inc., San Diego, CA (US)

(*) Notice: Subject to any disclaimer, the term of this patent is extended or adjusted under 35 U.S.C. 154(b) by 388 days.

(21) Appl. No.: 09/858,672

(22) Filed: May 15, 2001

(65) Prior Publication Data

US 2002/0187780 A1 Dec. 12, 2002

(51) Int. Cl.[7] .................................................. H04Q 7/20
(52) U.S. Cl. ...................... 455/436; 455/432.1; 455/450
(58) Field of Search ............................... 455/62, 432.1, 455/450, 452.1, 452.2, 552.1, 436

(56) References Cited

U.S. PATENT DOCUMENTS

| | | | | |
|---|---|---|---|---|
| 5,159,625 A | * | 10/1992 | Zicker | 455/432.1 |
| 5,613,204 A | * | 3/1997 | Haberman et al. | 455/432.3 |
| 5,870,674 A | * | 2/1999 | English | 455/432.2 |
| 6,128,489 A | | 10/2000 | Seazholtz et al. | 455/432 |
| 6,167,268 A | | 12/2000 | Souissi et al. | 455/434 |
| 6,169,903 B1 | | 1/2001 | Dorenbosch et al. | 455/458 |
| 6,175,740 B1 | | 1/2001 | Souissi et al. | 455/456 |
| 6,243,588 B1 | * | 6/2001 | Koorapaty et al. | 455/456.2 |
| 6,430,396 B1 | * | 8/2002 | Bamburak et al. | 455/62 |
| 6,529,491 B1 | * | 3/2003 | Chang et al. | 370/335 |
| 6,549,776 B1 | * | 4/2003 | Joong | 455/433 |
| 6,564,055 B1 | * | 5/2003 | Hronek | 455/433 |

* cited by examiner

Primary Examiner—Edward F. Urban
Assistant Examiner—Nhan Le
(74) Attorney, Agent, or Firm—Foley & Lardner LLP

(57) ABSTRACT

A multi-mode mobile station performs an inter-system handoff between systems, qualified by the presence or absence of a preferred wireless communication network in a roaming lookup table stored and maintained in either mobile station memory or with the network controller. In one embodiment the accurate location of the mobile unit is determined by a global position fix, after which a coverage map is consulted to verify the availability of a preferred network before initiating a background scan. In other embodiments, a learning function creates habit profiles of a subscriber's regular behavior upon which the system intelligently initiates scanning for a preferred network.

26 Claims, 10 Drawing Sheets

| Cell ID | GPRS | PAN |
|---|---|---|
| 10101010 | No | No |
| 11110000 | No | No |
| 11111111 | No | No |
| 00001111 | Yes | Yes |

Figure 6

SYSTEMS AND METHODS FOR INTELLIGENT INTER-SYSTEM HANDOFF

FIELD OF THE INVENTION

The present invention relates generally to wireless communications, but more specifically to systems and methods for intelligent inter-system handoff in wireless communication internetworks.

BACKGROUND

The trend toward wireless communications is due to a number of sources—notably, the industrialized world's increasingly mobile workforce. As well, low cost manufacturing and nearly free international trade make supplying the world's hearty appetite for wireless products easier. Governments too, seem recently more amenable to loosing their grip on the electromagnetic spectrum.

But above all, consumer demand for instant and universal information access has fueled expansion of the wireless communication industry. In effort to keep pace, unfortunately, the global wireless infrastructure has become an intricate patchwork of largely non-cooperative solutions to localized problems. Worse, to meet the demand for more wireless capability, it is expected that the industry will proliferate, not consolidate, the number of wireless telecommunications standards.

Mobile devices with built-in multi-mode switching capability provided a first-cut stopgap solution to the interoperability problem with respect to Wireless Wide Area Networks (w-WANs). But while current-generation mobile devices ship with dual-mode capability (e.g. AMPS and CDMA), or possibly tri-mode capability, such systems are decidedly crude and inefficient—for instance, scanning continuously in search of a preferred network.

Further, because of the nature of the built-in multi-mode capability, such mobile units are still pre-configured to operate in a limited number of specific wireless communication networks. Thus, if one of these specific systems is not available then the mobile device will still not be able to acquire service even if another wireless communication network is available.

And, to be sure, the demand for wireless voice and data now extends well beyond telephones to include personal mobile communication devices of all types, including personal digital assistants. Hence, tomorrow's mobile communication systems must improve multi-mode reliability for a variety of mobile types, while conserving a device's precious MIPS, battery reserve, and the like.

Moreover, there is proliferation of Wireless Local Area Network (W-LANs) and Wireless Personal Area Networks (W-PANs) that are designed for efficient wireless communication over smaller areas, such as in an office building. Therefore, it would be advantageous for a mobile device to be able to switch from W-WAN operation to W-LAN or W-PAN operation when the latter is available. This could not only conserve battery power, but it could also provide other advantageous such as cost.

SUMMARY OF THE INVENTION

The systems and methods for intelligent inter-system handoff conserves mobile unit resources by performing a conditional scan, rather than a continuous background scan. In a region of overlapping coverage between competing wireless communication networks, a multi-mode mobile station switches from a non-preferred network to a preferred network contingent upon the presence of an entry in a roaming table. A roaming table is a lookup table having an entry corresponding to the presence or absence of a preferred network coverage area overlapping or completely contained within a cellular coverage area circumscribed by a non-preferred wireless communication network. A unique cell identifier assigned to each cell in the non-preferred network is used to find a match in the lookup table, which match signals an approval for the mobile station to initiate a search for the corresponding preferred network. The roaming table may be multi-dimensional as well, capable of supporting nested coverage areas.

In one embodiment, the systems and methods for intelligent inter-system roaming the roaming table includes position information for the available networks. The roaming table is then consulted after an accurate position determination for the mobile station has been secured via GPS fix, or other positioning system In still other embodiments, the systems and methods for intelligent inter-system roaming garners intelligence by means of a learning function. The learning function algorithm records and learns the regular habits of its subscriber by profiling periodic activities, such as a subscriber's regular commute to work, and modifies the scanning frequency accordingly. Efficient scanning, regulated by the learning function, results therefrom.

Finally, the systems and methods for intelligent inter-system handoff facilitates roaming to and from any one of a WAN, a LAN, or a PAN, giving the subscriber automatic cost savings by switching to a less expensive, higher speed network if one is available.

Other aspects, advantages, and novel features of the invention will become apparent from the following Detailed Description of Preferred Embodiments, when considered in conjunction with the accompanying drawings.

BRIEF DESCRIPTION OF THE DRAWINGS

FIG. 6 is an illustration of an example roaming table in accordance with one embodiment of the invention;

DETAILED DESCRIPTION OF THE PREFERRED EMBODIMENTS

To combat the problems with inter-system roaming described above, the systems and methods for inter-system handoff use mobile devices comprising wireless modems configured for operation in a plurality of wireless communication networks. As with dual-mode operation, the mobile devices must scan to find a preferred communication network. To limit the need to constantly scan for each of the plurality of systems, however, the systems and methods described herein utilize information concerning which systems are within range of the mobile device to cut down the scanning requirements. Thus, the mobile device will only scan if a preferred network is in range and then it will only scan for preferred networks.

While the description below generally refers to mobile phones, it will be apparent that the systems and methods described herein are applicable to any mobile communication device. Thus, for example, systems and methods for inter-system handoff can also be applied to Personal Digital Assistants (PDAs), or computing devices, such as laptops or other handheld computers, that include a wireless modem or a port for interfacing with a wireless modem card. As such, the description that follows, as it relates to a specific types of wireless communication networks or to specific mobile devices, is by way of example only.

Different wireless communication networks will use different wireless access technology for accessing communication channels within each network as well as different communication protocols that allow various devices to communicate with each other over a particular network. Thus, a mobile device configured for multi-mode communication, must include a wireless modem capable of implementing the wireless access technology and communication protocol required by each wireless communication network in which the mobile device is configured to operate.

Figure 1:
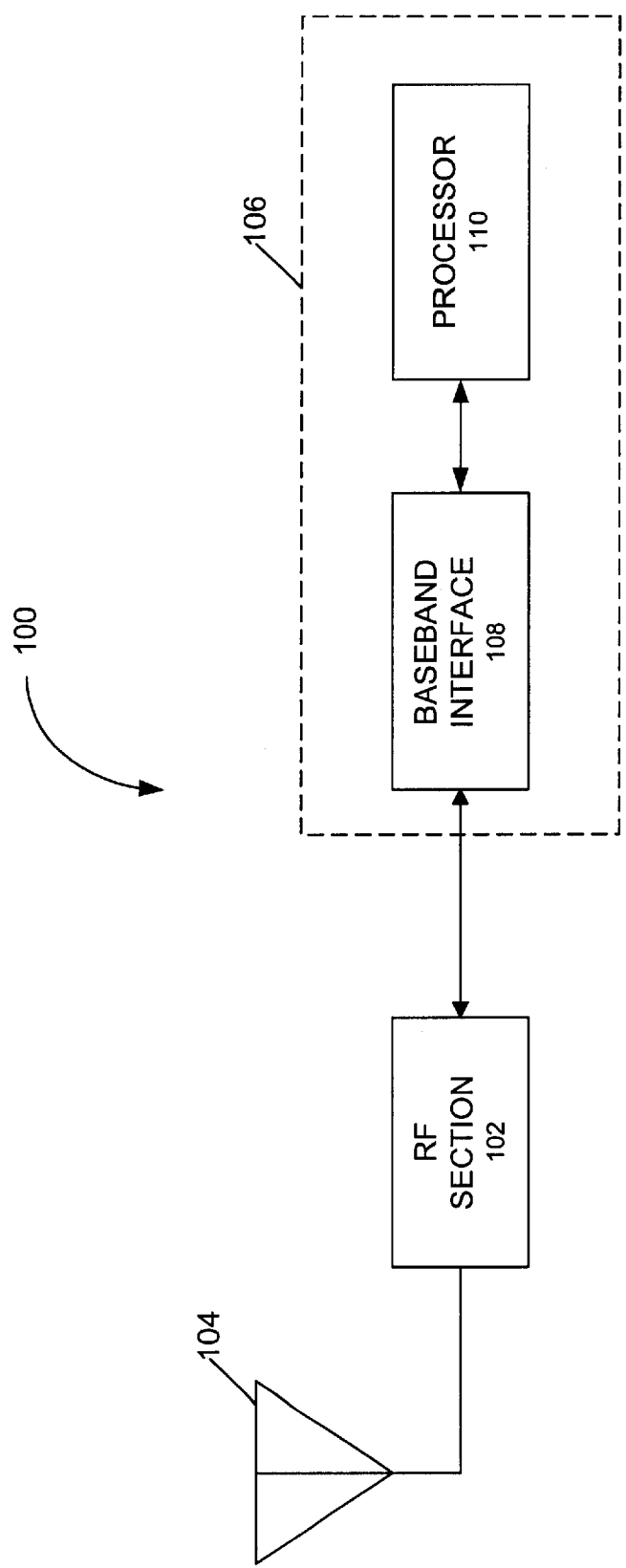
FIG. 1 is a logical block diagram illustrating an exemplary wireless modem.

FIG. 1 is a logical block diagram illustrating the basic functional units of an exemplary wireless modem 100. Wireless modem 100 includes a RF section 102 that is configured to transmit and receive RF signals via antenna 104 and baseband section 106.

Figure 2:
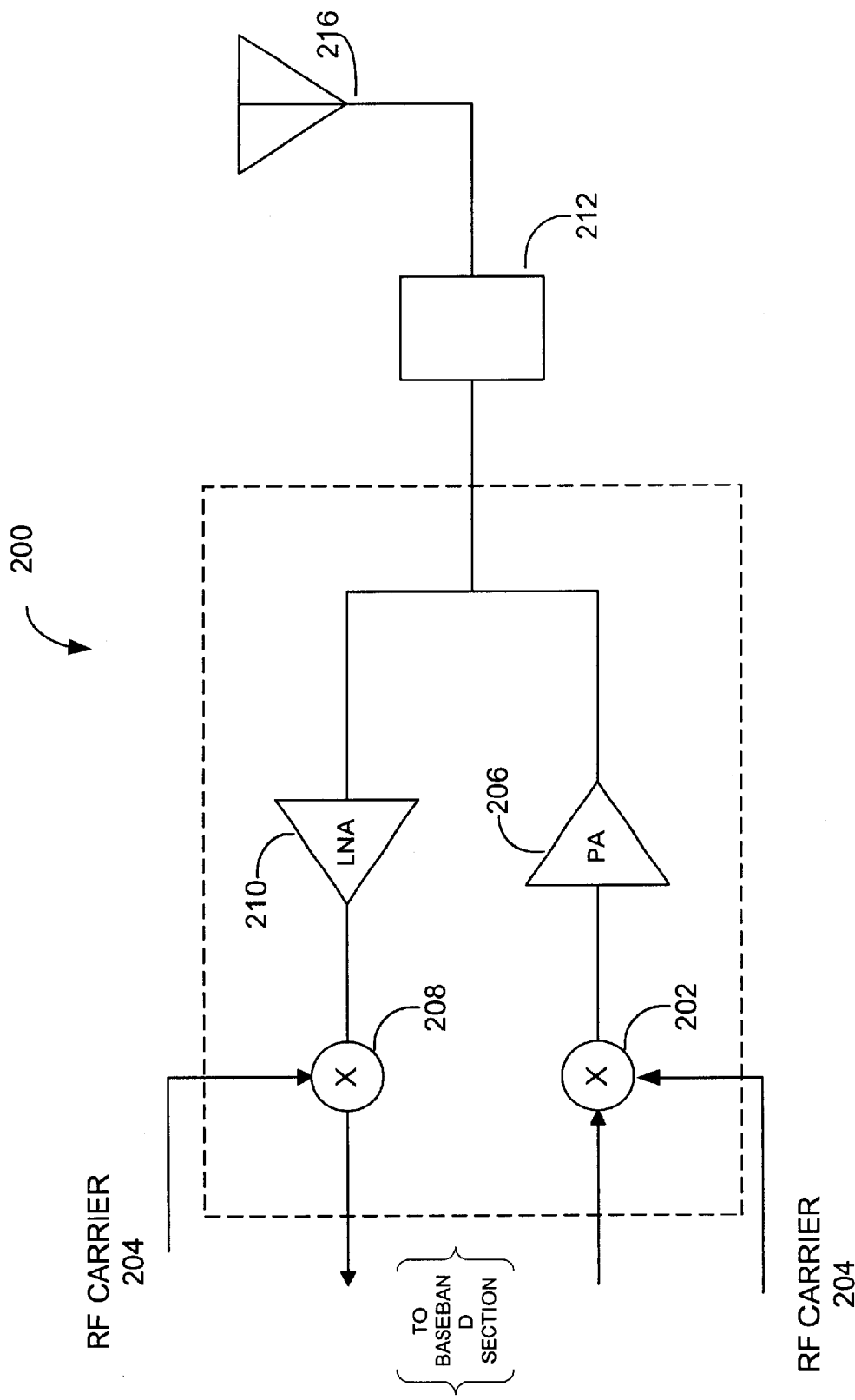
FIG. 2 is a logical block diagram illustrating an exemplary transceiver that can be used in the modem of FIG. 1.

RF section 102 comprises a transceiver used to transmit and receive RF signals over a wireless communication channel. An example transceiver 200 is illustrated in FIG. 2. Transceiver 200 is split into a transmit and receive path. The transmit path comprises a modulator 202 that modulates baseband signals from baseband section 106 with an RF carrier 204 in order to generate an RF transmit signal. RF carrier 204 is a sinusoidal carrier signal with a frequency equal to that required by the communication channel used by modem 100 to communicate over a W-WAN, for example. The transmit path of transceiver 200 may also include a Power Amplifier (PA) 206. PAs are typically key components in any high frequency RF transmitter design. This is because RF transmitters typically require high output power to compensate for path losses and to achieve satisfactory signal levels at antenna 216.

The receive path of transceiver 200 comprises a demodulator 208 that modulates a received RF signal with RF carrier 204 in order to remove the carrier and extract the baseband information signal from the received RF signal. The receive path may also include a Low Noise Amplifier (LNA) 210. The RF signals received by antenna 216 are typically at very low signal levels. Therefore, LNA 210 is required in order to amplify the signal level, but not introduce noise that could swamp the low-level received signal.

The baseband signal extracted from the received RF signal is then sent to baseband section 106. Baseband section 106 can comprise a processor 110 and a baseband interface 108. Baseband interface 108 converts baseband signals received from RF section 102 to digital signals that are sent to processor 110. Processor 110 decodes the information in accordance with the appropriate communication protocol.

Conversely, digital information to be transmitted by wireless modem 100 is first encoded by processor 110 and then sent to baseband interface 108, where it is converted into a baseband signal and sent to RF section 102.

Processor 110 and interface 108 can be integrated into one device. Moreover, processor 110 can be a microprocessor, microcontroller, digital signal processor, or a combination thereof.

The receive and transmit paths are typically duplexed over a common connection to antenna 216. The impedance of the connection, however, needs to match the impedance of the antenna for the antenna to transmit the RF transmit signal efficiently. If the impedance is not matched, then RF energy will be reflected back in the opposite direction when a transmit or receive RF signal reaches the connection. Therefore, a matching network 212 can be included in order to match the impedance between the connection and the antenna. Typically, for example, the connection will have impedance of 50 ohms. Therefore, matching network 12 needs to adjust the impedance of antenna 216 to be reasonably close to 50 ohms.

Processor 110 is typically responsible for tuning RF section 102 to the proper RF frequency for communication in a particular wireless communication network. Once RF section 102 is tuned to the proper frequency, modem 100 will typically scan for a network control channel and, upon accessing the control channel, will send registration messages to the network.

Wireless communication networks can be classified according to the method used to provide access to multiple users seeking to utilize the network in parallel, i.e., the wireless access technology. The wireless access technology defines how a communication channel in a particular wireless communication network is accessed. RF section 102 is responsible for implementing the appropriate wireless access technology. Thus, as mentioned, RF section 102 must be configured to implement the access technology of each network in which wireless modem 100 is intended to operate.

One example of an access technology commonly used for W-WANs is Frequency Division Multiple Access (FDMA). In an FDMA network, the available frequency spectrum is divided into multiple narrow bands, each of which defines a separate channel. Different users are allocated different bands. Since the bands are separated by frequency, multiple users can access the network in parallel. The original wireless communication networks all used FDMA. The name for these systems was Advanced Mobile Phone Service (AMPS).

In Time Division Multiple Access Systems (TDMA), the available frequency spectrum is divided into multiple narrow bands, and each band is in turn divided into multiple time slots. A channel is defined as a particular time slot within one of the frequency bands. Again, since the channels are separated in time, or time and frequency as the case may be, multiple users can access the network in parallel.

In Code Division Multiple Access (CDMA) or Direct Sequence Spread Spectrum (DSSS) systems, channels are defined by complementary, orthogonal or pseudo-random spreading sequences or codes. The spreading sequence has a frequency much higher than that of a user's information signal. Each user is assigned a unique spreading sequence. At the transmitter, the user's information signal is multiplied by the spreading sequence assigned to the user. Since the frequency of the spreading sequence is much higher than that of the user's information signal, the bandwidth of the information signal is effectively spread by this action.

The spread signals for each of the users are then simultaneously or concurrently transmitted over the same wideband frequency spectrum. At the receiver, each user's information signal is retrieved from the received signal by multiplying the received signal by the spreading sequence for the user, and then integrating and sampling the product. Since the spreading sequences are orthogonal or pseudo-random, each user's information signal can be retrieved from the same received signal.

Thus in a wireless communication network, the air interface between mobile devices and the wireless communication network will implement an access technology such as one of the access technologies described above as will the air interface in a W-LAN or a W-PAN.

When modem 100 switches from one network to another, it switches from one access technology to another. This is referred to a mode switching. Mode switching can also refer to modem 100 switching communication protocols used by processor 110 from one communication protocol to another. This can happen, for example, when modem 100 is switching between networks that use the same type of access technology, but different communication protocols.

Processor 110 is responsible for implementing the communication protocol required by the wireless communication network. For voice communication, this involves encoding voice information in the proper format, e.g., the proper frame size, data rate, compression algorithm, etc., used by the particular wireless communication network in which modem 100 is operating.

Voice communication networks that use the same access technology will often use the same communication protocol as well. But W-LANs or W-PANS will typically use different communication protocols than W-WANs or other W-LANs or W-PANs. Moreover, the communication protocols for wireless data communication can vary widely, including whether the protocol is packet based or circuit switched. Some example data communication networks/protocols are: cdma2000™ 1xRTT and HDR, GPRS, CDPD, HCCSDS, at the W-WAN level; and Bluetooth™ systems, Home RF™ Systems, IEEE 802.11, at the W-LAN, W-PAN level.

Figure 3:
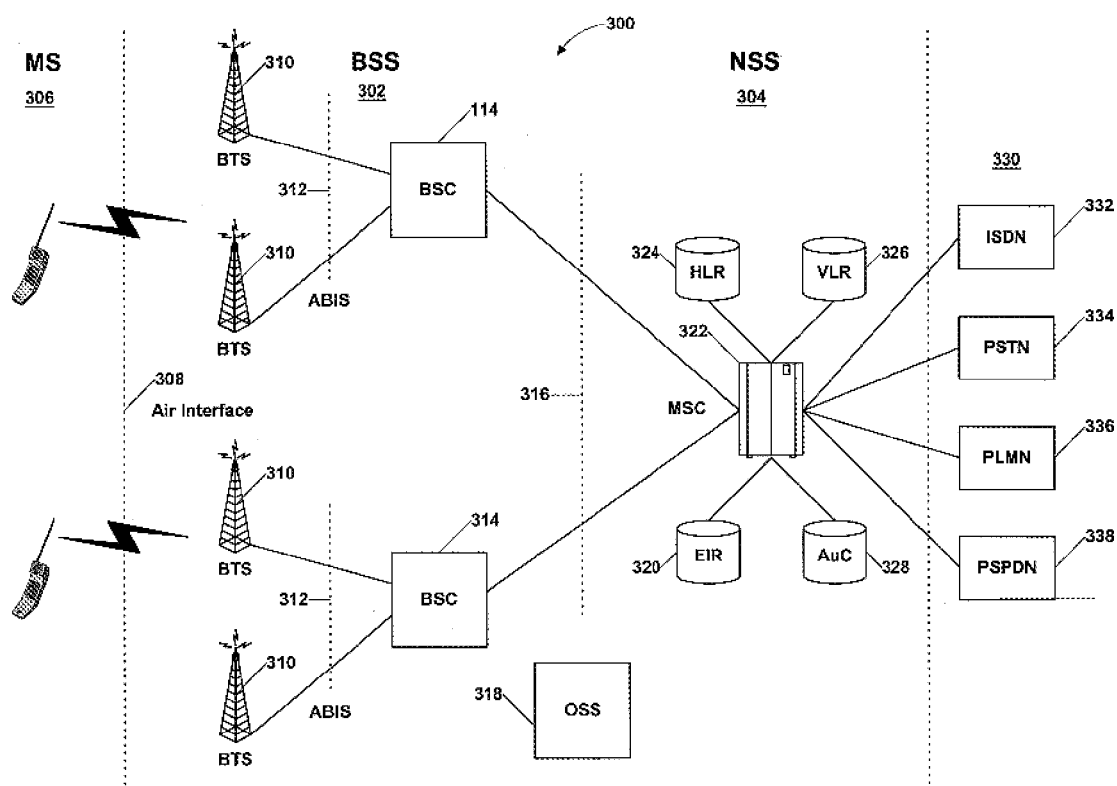
FIG. 3 is a diagram illustrating an exemplary wireless communication network.

FIG. 3 illustrates a block diagram of an exemplary W-WAN 300. FIG. 3 is provided in order to illustrate how a mobile device communicates within a W-WAN. The basic communication principles that apply to W-WAN 300 will also, however, apply to a W-LAN or to a W-PAN.

W-WAN 300 is divided into four interconnected components or subsystems: Mobile Station (MS) 306, Base Station Subsystem (BSS) 302, Network Switching Subsystem (NSS) 304, and Operation Support Subsystem (OSS) 318. Generally, MS 606 is the mobile device or phone carried by the user; however, MS 306 may be any multi-mode wireless communication device, such as the PDA discussed above, equipped to process voice, data, video or other data types. BSS 302 interfaces with multiple mobiles to manage the radio transmission paths between MS 306 and NSS 304. In turn, NSS 304 manages network-switching functions and facilitates communications with other networks such as the PSTN and the ISDN. OSS 318 facilitates operation and maintenance of the network.

MS 306 communicates with BSS 302 across a standardized radio air interface 308. BSS 302 is composed of multiple base transceiver stations (BTS) 310 and base station controllers (BSC) 314. BTS 310 is usually in the center of a cell and consists of one or more radio transceivers, each equipped with an antenna. It establishes radio links and handles radio communications over the air interface with MSs 306 within the cell. The transmitting power of the transceiver defines the size of the cell. Each BSC 314 manages multiple transceivers. The total number of transceivers assigned to a particular controller may number in the hundreds. The transceiver-controller communication is over a standardized "Abis" interface 312. BSC 314 allocates and manages radio channels and controls handovers of calls between its transceivers.

BSC 314, in turn, communicates with NSS 304 over a standardized interface 316. For example, in a GSM network, the interface uses an SS7 protocol and allows use of base stations and switching equipment made by different manufacturers. A Mobile Switching Center (MSC) 322 is the primary component of NSS 304. MSC 322 manages communications between mobile subscribers and between mobile subscribers and public networks 330. Examples of public networks 330 include: Integrated Services Digital Network (ISDN) 332, Public Switched Telephone Network (PSTN) 334, Public Land Mobile Network (PLMN) 336, and Packet Switched Public Data Network (PSPDN) 338.

MSC 322 typically will interface with several databases to manage communication and switching functions. For example, MSC 322 may interface with Home Location Register (HLR) 324 that contains details on each subscriber residing within the area served by MSC 322. There may also be a Visitor Location Register (VLR) 326 that temporarily stores data about roaming subscribers within a coverage area of a particular MSC 322. An Equipment Identity Register (EIR) 320 that contains a list of mobile equipment may also be included. Further, equipment that has been reported as lost or stolen may be stored on a separate list of invalid equipment that allows identification of subscribers attempting to use such equipment. Finally, there may be an Authorization Center (AuC) 328 that stores authentication and encryption data and parameters that verify a subscriber's identity.

Today's working W-WAN protocol standards support seamless intra-network roaming and call delivery. That is, an MS 306 may roam freely—without call interruption—between neighboring and overlapping BSC 314 coverage areas within a W-WAN, such as W-WAN 300. A W-WAN also accomplishes handoff between channels serviced by different BSCs 314 within a network provider area as well as between channels under the control of different MSCs 322 in the same Public Land Mobile Network (PLMN).

Intra-system roaming, however, is not to be confused with the roaming technique employed by the systems and methods for intelligent inter-system handoff. In intersystem roaming, connection handoff occurs between dissimilar, competing networks whenever a mobile device discovers the existence of a second, preferred network within the coverage area boundary defined by a first network. Inter-system handoff is closely aligned theoretically with mode switching in dual mode phones—for instance, a dual mode phone with capability of switching from an analog AMPS mode to a CDMA mode whenever the mobile detects the presence of a CDMA network in the vicinity.

Figure 4:
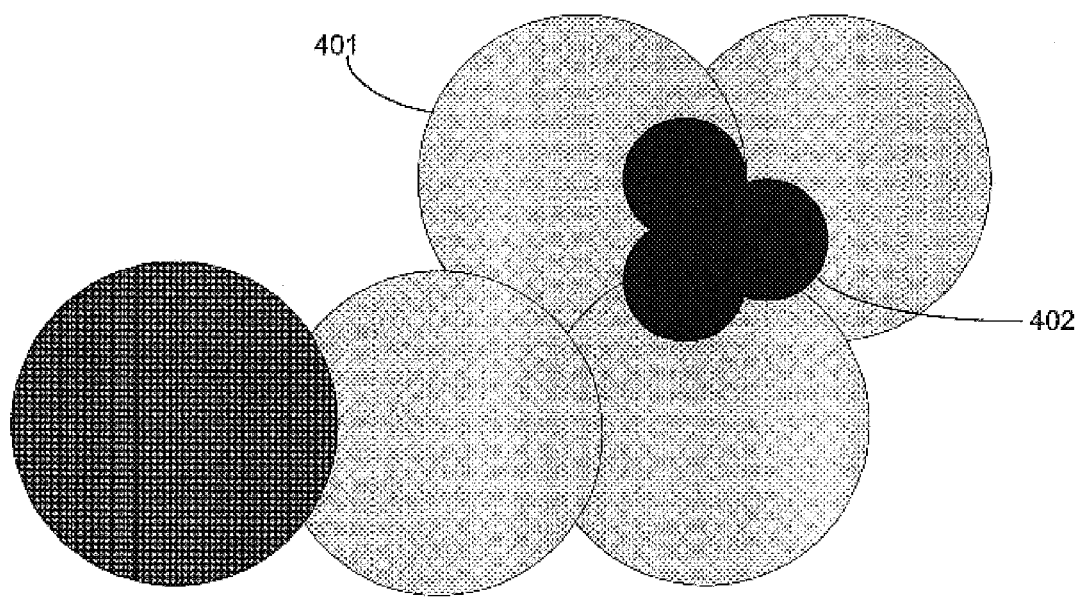
FIG. 4 is a diagram illustrating overlapping coverage areas for a plurality of wireless communication networks, such as the network of FIG. 3.

FIG. 4 exemplifies a cell layout plan corresponding to the wireless communication network blueprint exemplified in FIG. 3. An overlapping patchwork of coverage areas, called cells, provides a region with complete call coverage as a mobile device moves among the cells. In other words, the five large circular cells of FIG. 4 comprise a wireless communication network whose supporting infrastructure would include five BTSs 310 (one BTS per cell), one or more BSCs 314, and one or more MSCs 322, as portrayed in FIG. 3.

As a practical matter, coverage areas between competing wireless communication networks are not mutually exclusive—nothing assures that one network will end where another network begins. Multiple regions of intersection and overlap among public W-WANs, private W-LANs, and even proprietary W-PANs, are common among wireless inter-networks. FIG. 4 is one such inter-network.

A group of small overlapping coverage areas forming a preferred network 402 overlays the patchwork of large overlapping coverage areas forming network 401. As mobile device travels from network 401 into a coverage area of preferred network 402, the mobile device switches to a preferred mode of operation, pre-defined to correspond to the preferred network 402.

As an example, preferred network 402 may be a pre-defined Bluetooth PAN whose overlapping coverage area substantially overlays the geographical region in the vicinity of mobile device subscriber's workplace. Outside of the immediate vicinity of the mobile device subscriber's workplace, the non-preferred coverage area defined by network 401 provides coverage for the device subscriber, say while traveling to and from the workplace.

Thus, it is preferable that the subscriber's mobile device be configured to use preferred network 402 when the subscriber is at work, but be able to switch to network 401 when the subscriber leaves work. This can be extended to even more competing networks in even more places. For example, the subscriber's home may be serviced by a W-PAN. Therefore, the subscriber's mobile device can preferably select from a plurality of available networks the one that is most preferable for the given conditions.

Network preference is often simply a matter of real-world cost savings and/or desire for higher speed; in other words, subscribers will want to ensure that their mobile station communicates with the lowest cost and fastest W-LAN, W-WAN, or W-PAN available. In many cases, a workplace W-LAN or W-PAN will be a subscriber's cost or speed preference. Preferably, though, the subscriber is in control of the network preferences. As such, in one embodiment, the subscriber sets the preference hierarchy based on speed, cost, quality of service, traffic, etc. as a programmable parameter.

Figure 5:
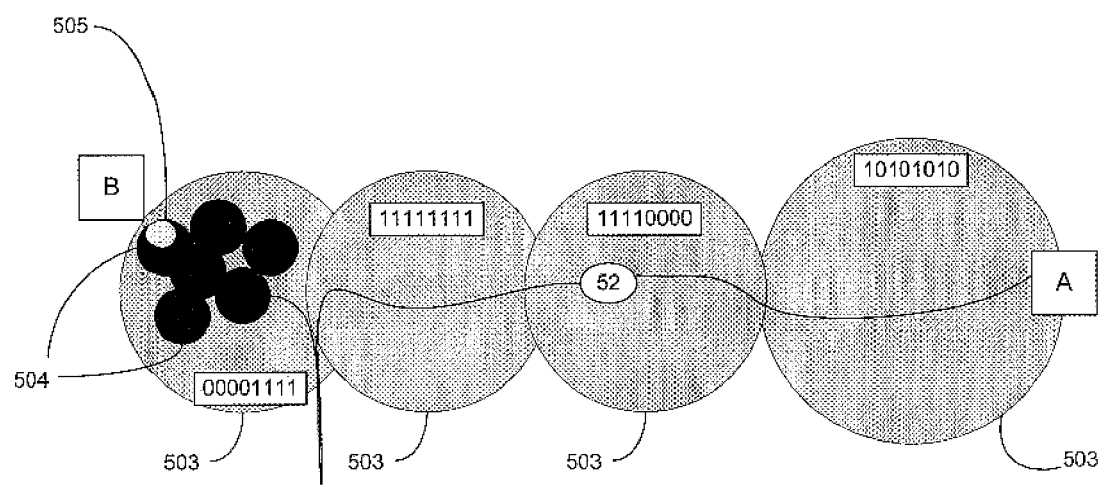
FIG. 5 is another diagram illustrating overlapping coverage areas for a plurality of wireless communication networks.

FIG. 5 portrays a coverage area layout employed by the systems and methods for intelligent inter-system handoff according to one embodiment of the present invention. Network 503 comprises overlapping coverage areas, which substantially overlay a highway 507. Network 503 may be, for instance, a W-WAN used for voice communication as well as data communication. The coverage areas of network 503 are each identified by a unique cell identifier (CID), which for purposes of illustration may be an eight-bit binary code.

Embedded within the coverage area of network 503 whose CID is 00001111 is a second network 504. Second network 504 can be, for instance, a wireless data network such as general packet radio system (GPRS) network. Embedded within second network 504 is a third network 505, which third network is also contained within the boundaries of coverage area 00001111 of first network 503. Third network 505 can be for instance a Bluetooth (PAN) or an 802.11b Network (LAN).

Thus, the systems and methods for intelligent inter-system handoff can call for a mobile device configured to roam between networks 503, 504, and 505. In order to prevent such a mobile device from constantly scanning for each of the networks in attempt to acquire whichever one is preferred at a given time, the device preferably includes a roaming table comprising data that supports more efficient scanning.

In the context of FIG. 2, a mobile device user may be traveling along highway 507 from point A to point B. As the user travels from point A to point B, the mobile device is moving through the coverage areas of network 503. Once the device reaches coverage area 00001111, it will move through the coverage area of network 504 and then through the coverage area of network 505.

Roaming information related to the three networks can then be stored in a roaming table. FIG. 6 is a sample roaming table populated with data to support roaming from a UMTS network (i.e., non-preferred network 503) to a GPRS network (i.e., preferred network 504). Table 600 contains a first column 602 for storing the cell identifiers, one CID for each cellular coverage area defined by the UMTS network. The second column 604 in table 600 stores pre-programmed binary values (i.e., in the form of a yes/no flag) to indicate the presence or absence of a GPRS network within the UMTS cellular coverage area defined by a given CID. The third column 606 indicates the presence or absence of a PAN in the area defined by a given CID.

In this example, the UMTS coverage area defined by CID 11110000 does not overlay a GPRS network and so an appropriate binary value of No appears in column 604 for the row corresponding to CID 11110000. Conversely, the UMTS coverage area defined by CID 00001111 encompasses GPRS network 504 and hence, a binary value of Yes appears in column 604 for the row corresponding to CID 00001111.

In such manner, the pre-recorded presence of all known wireless communication networks in the vicinity are tracked via this roaming table mechanism. Before a mobile device operating in network 503, but also configured for operation in networks 504 and 505, begins scanning for networks 504 and 505, it first checks a roaming table, such as table 600. The mobile device then only scans for one of the other networks if the data stored in the table indicates that one of the other networks is present within the current coverage area.

The foregoing operative description of lookup table 600 exemplifies the roaming table mechanism under a simple, three-network model. However, the systems and methods for intelligent inter-system handoff contemplate expandable, multi-columnar embodiments of lookup table 600.

The networks stored in the table can also have a priority or preference rank. For example, network 505 can have the highest priority, followed by network 504, and then network 503. Thus, the mobile device traveling along highway 506 must roam from network 503 to network 504 if it comes in range of network 504. And from network 504 to network 505 if it comes in range of network 505.

As the device travels from coverage area to coverage area within network 503 along highway 507, it will continually check a roaming table, similar to the one shown in FIG. 6, for the presence of a preferred network. When the device enters cell 10101010, for example, it checks for the presence of one of the preferred networks 504 or 505. The roaming table will indicate that no preferred networks are present and, therefore, the device will not waste resources scanning for network 504 or network 505. But when the device enters coverage area 00001111, the presence of network 504 and network 505 will be indicated in the roaming table. The device can then begin scanning for these networks.

A table, such table 600, can be loaded into a mobile device, and stored in memory, when the device leaves the factory, or when the device is sold to a subscriber. For example, a cable can be used to interface to the device and download the table. The table can also be download into the device over the air, once the subscriber activates the mobile device in a particular network.

Alternatively, the device can be configured to construct the table itself. In this case, each time the mobile device encounters a new network it can store the CID and other network identification in the table. If, while within a coverage area of the newly found network, the mobile encounters another network, then the network would not only be added to the table, but the table would also be updated to indicate that the coverage area of this second network overlaps the coverage area of the first network. In this manner, an entire table, such as table 600, can be constructed and stored within the mobile device.

This method of constructing table 600 has the added advantage that the table only contains networks with which the subscriber comes in contact. In other words, the table does not needlessly contain information related to networks with which the subscriber never comes in contact. Thus, saving the precious memory resources of the mobile device.

Figure 7:
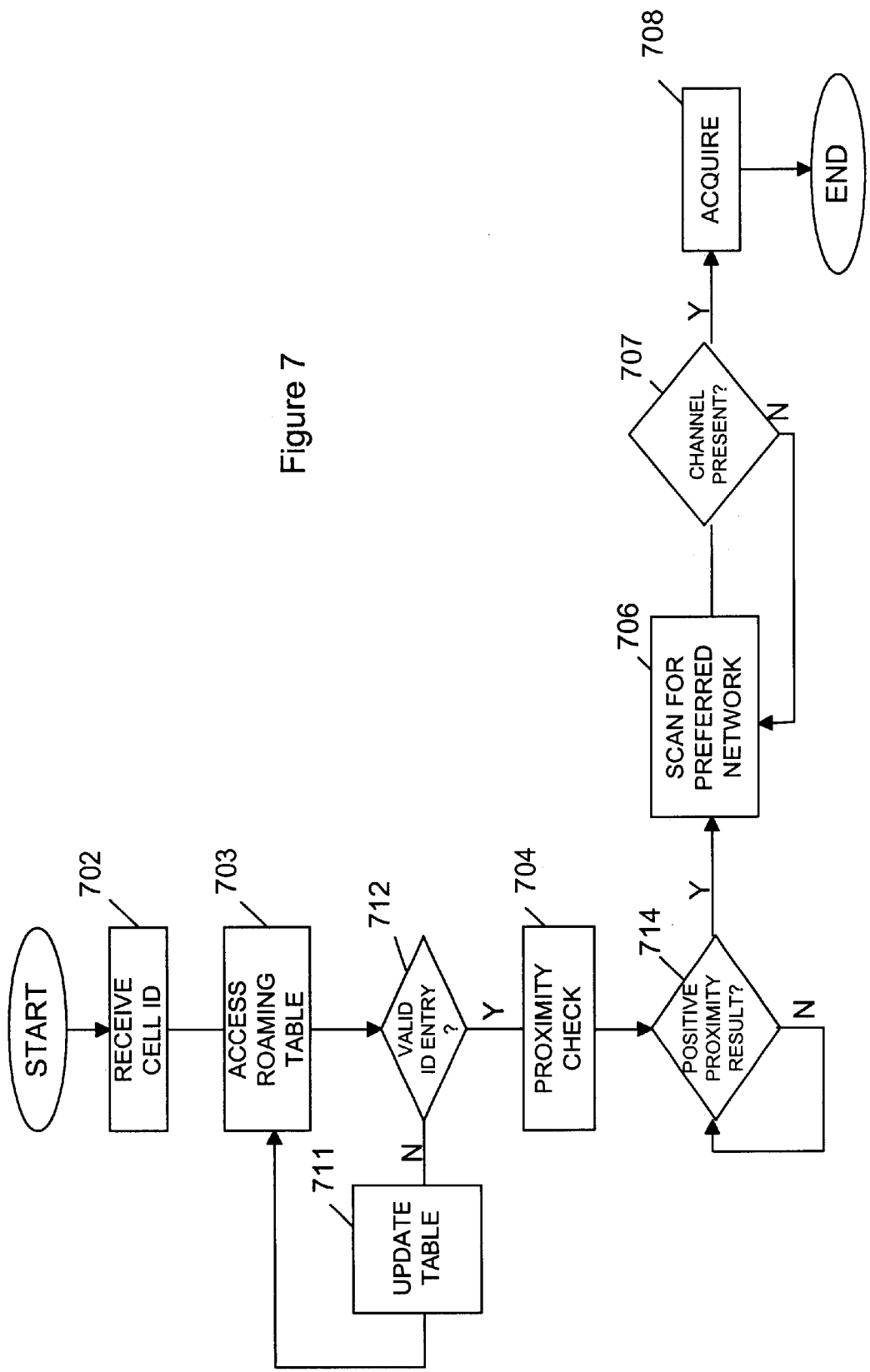
FIG. 7 is a flow chart illustrating one example method of roaming from a non-preferred network to a preferred network using a roaming table, such as the roaming table of FIG. 5.

Once the table is loaded into the device, it can be used for inter-system roaming. FIG. 7 is a flow chart, which describes an example process of roaming from a non-preferred network to a preferred network using such a table.

The method begins with a multi-mode device camped onto a channel in a non-preferred network, such as network 503. Step 702 is a location-based determination in which the device receives a CID for a cell from the non-preferred network. For example, the service provider of cell 00001111 broadcasts CID 00001111 to the device either at power-on or upon entry into the cell. The device decodes the CID in step 702 by listening to the BSC channel and parsing the bits that correspond to the CID.

In step 703, the device accesses a roaming table, such as table 600, stored in memory to confirm or deny the existence of a preferred network within the cell. In step 712, the device determines whether the CID corresponds to a valid entry in table 600.

Absence of an entry for the cell in roaming table 600 can force an update to the table in step 711. In fact, the systems and methods for intelligent inter-system handoff accommodates several possibilities for the continual maintenance of roaming table 600; the absence of a single table entry, as just described, is but one possible occurrence.

Other table maintenance operations include changes (e.g., updates to table entries when a preferred network cell is added to an existing non-preferred coverage zone) and deletions (e.g., removal of a table entry when a cell is permanently removed from a network). Each of these maintenance operations, including the original creation of the table itself, can be engineered to happen automatically, that is, without external intervention by the network controller or other entity. If, for instance, a mobile device travels to a region hosting a newly implemented LAN cell site, the mobile device may perform its own roaming table updates as shown in step 711 of FIG. 7. An automatic modification to roaming table 600 may also occur when the device encounters an erroneous or unrecognized cell ID, which might happen, for instance, if an entry in table 600 becomes corrupted. The newly transmitted cell ID received from the network can conveniently be used to overwrite the corrupted entry.

Alternatively, updates to the table can be provided over the air. For example, the device can be configured to periodically request table updates from some or all of the networks in which the device is configured to operate, e.g., whenever the device enters a new network coverage area. Conversely, some or all of the networks can be configured to periodically broadcast table updates.

Table updates can even be maintained on a website operated by one or more network providers. The updates can then be downloaded from the Internet to a computer and then into the device through a cable. Or if the device is configured for wireless Internet access, then updates can be downloaded from the Internet directly into the device Moreover, the table does not necessarily need to be stored in the mobile device. Instead, the table can be stored, for example, on the network, i.e., in the NSS. An external table location offers several advantages: The most important advantage is the increased storage potential, which far exceeds the practical limits of the device memory. Secondly, from the perspective of system-wide efficiency, a centrally located roaming table offers multiple simultaneous access, outweighing any downside potential from an increase in latency accruing from external calls to the off-unit storage interface. Furthermore, multiple access to an externally situated roaming table is far and away the one feature of the systems and methods for intelligent inter-system handoff most likely to noticeably ease the table maintenance burden in a congested, fast-changing multi-network environment. Finally, a single, centrally maintained roaming table rids the intelligent inter-system systems and methods of data redundancy. In other words, the redundancy of having multiple copies of the data stored on each mobile device is replaced by having one central location where the data is stored.

If the table is stored on the network, then there can be several methods for accessing the information contained therein. For example, when the device enters a certain cell, the network can automatically inform the device of other available networks with overlapping coverage area. The device can then determine if one of these available networks is a preferred network and begin scanning if in fact one of the networks is preferred.

Alternatively, the network can be configured to force a scanning operation whenever the preferred network is available to the device. For example, the network can easily determine when the device is within the coverage area of a preferred network. Once the network makes this determination, it can send a command to the device to force the device to perform a scanning operation for the preferred network. In one embodiment, a signal order scan bit can be sent on the broadcast channel of every cell to indicate whether or not the device should scan for the preferred network. In this embodiment, the device is not required to store a roaming table.

The mobile device's identification information can even be used by the network to determine which types of networks the device is configured to operate in and/or which of networks are preferred for that device and then only download information related to these particular networks. Thus, the mobile device's computing power is conserved, because it does not need to waste computing power dealing with incompatible and/or non-preferred networks.

If the device is configured for wireless web access, then the table can even be stored on the Internet as opposed to on the wireless communication network.

Maintenance of the table can also be enhanced by centrally storing the table on the network. For example, if each time a mobile device encounters a new network it updates the table, then the table can be updated quicker, more efficiently, and more extensively, by having one table stored on the network.

Returning to FIG. 7, if a preferred network entry for the current cell exists in the roaming table, or if the network provides information related to a particular network, a method for determining the distance from the device to the preferred network follows next. Proximity-to-coverage determination in step 704 prevents unnecessary scanning in cases where, although a preferred network coverage area exists within the footprint of a cell, searching for it would be useless while the mobile device is out of range. The periodic proximity check (step 704) will alert the mobile device to begin a search as soon as the mobile device is within range of a preferred network transmitter.

One method of performing a proximity check is for the mobile device to scan for a control channel within the preferred network and to perform an RSSI or bit error determination. The RSSI or bit error determination is then compared to a threshold, i.e., a proximity threshold, in step 704. If the determination exceeds the proximity thresholds, then the positive conditional branch stemming from block 704 is traversed, and the network orders the mobile device to background scan for the preferred network in step 706, the existence of which having been assured in lookup step 703.

If the background scan discovers an available preferred network channel in step 707, the mobile device acquires the preferred network channel in step 708 and background scanning ceases—hand-off is complete. If no preferred network channel is immediately discovered in step 707, scanning can continue in the background until an interruption to the algorithm occurs (i.e., the subscriber powers off or exits the cell) or a preferred network channel is found.

If the proximity threshold determination fails, then the device can remain camped on the non-preferred network, periodically checking its proximity to the preferred network transmitter.

An alternative position determination can be based on the actual location of the device relative to the preferred network as determined by a posiitoner included in the device. In this case, the roaming table can also include coordinate position information for each network. The device can then make a determination of its own position and compare it to that of the preferred network. If the device determines it is within range of the preferred network then it can beginning scanning for a preferred network channel as described above.

The positioner can be, for example, a GPS receiver, which can make very accurate determinations of its position. Alternatively, the positioner can use time of arrival, angle of arrival, or beam forming techniques to determine the device's proximity to a preferred network.

Figure 8:
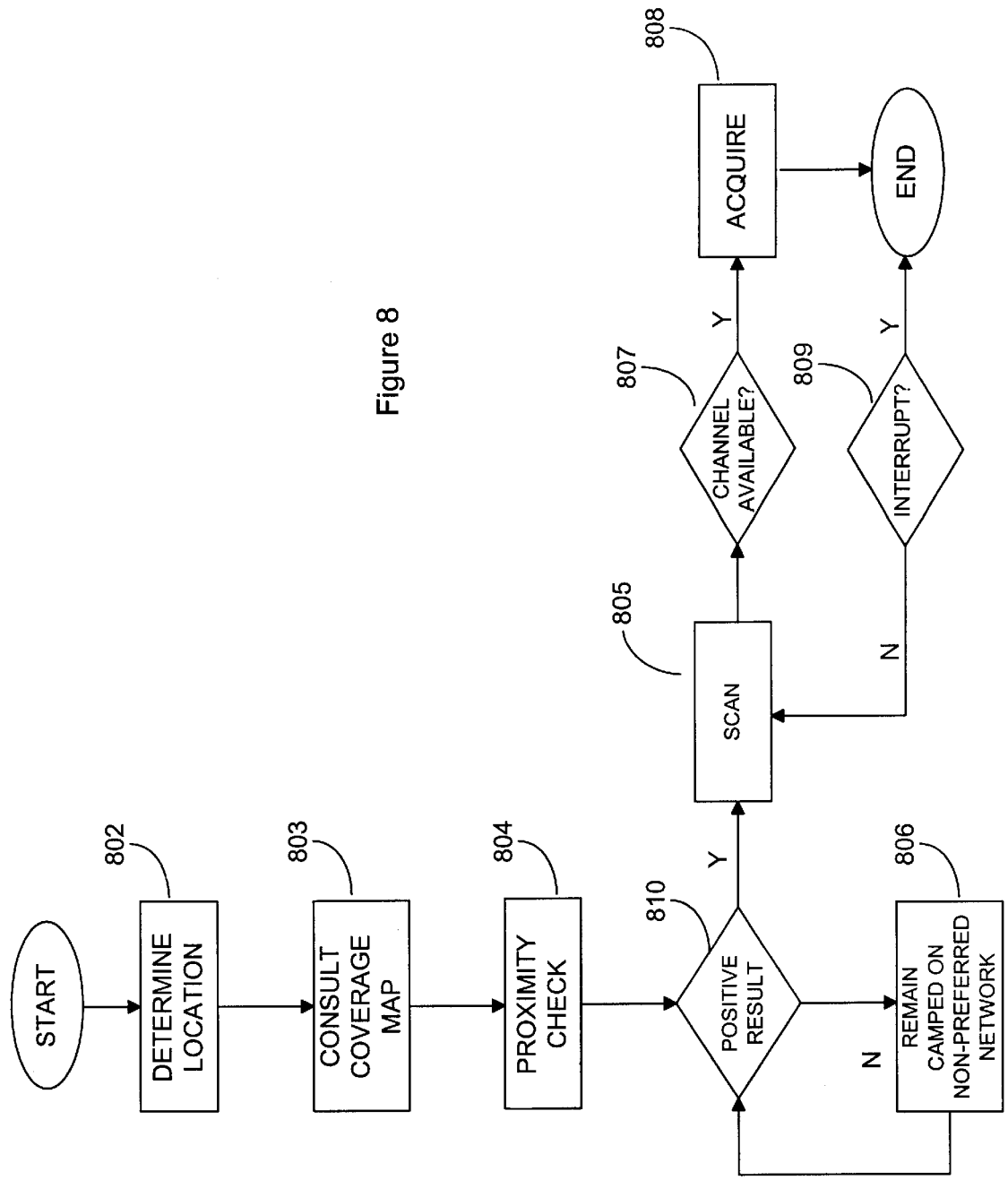
FIG. 8 is a flow chart illustrating one example method of roaming from a non-preferred network to a preferred network using a coverage map in accordance with one embodiment of the invention.

FIG. 8 is a flow chart illustrating another example process of roaming from a non-preferred network to a preferred network using a positioner. In step 802, the mobile device's location is precisely determined by exploiting a positioner, such as a GPS receiver, or other similar location identification mechanism. Based on this location determination, the handoff mechanism described in the paragraph to follow can be initiated either by the network or the mobile station.

After the position of the device is established in step 802, the mobile device seeks the availability of a preferred network using a roaming table that includes position information for various networks in step 803. A cyclical proximity check routine 804 follows, whereby the mobile device, through a periodic and continuous search for a preferred network, calculates the distance between the mobile device and the nearest preferred network.

As before, a transmitter-to-mobile distance calculation permits a proximity determination by resort to comparison (step 810) with a pre-determined threshold value. Here, however, the threshold is a stored distance value. If the proximity threshold determination fails, then the multi-mode station will remain camped onto the non-preferred network channel in step 806, periodically checking its proximity vis-a-vis a preferred network.

If the threshold distance comparison criterion is met in step 810, then the network controller orders the mobile to background scan for the preferred network in step 805. If the background scan discovers an available preferred network channel in step 807, the mobile acquires the preferred network channel in step 808. If no preferred network channel is immediately discovered in step 807, scanning continues in the background until an interruption to the algorithm occurs or a preferred network channel is found in step 809.

The intelligent inter-system handoff method can even use a learning function. The learning function feature is a type of expert system whereby the mobile device learns from the regular habits of its subscriber and adjusts its scanning accordingly. What constitutes a habit is both device- and user-specific; also, habit profiles may be developed for high-use subscribers with multiple recurring use patterns.

Figure 9:
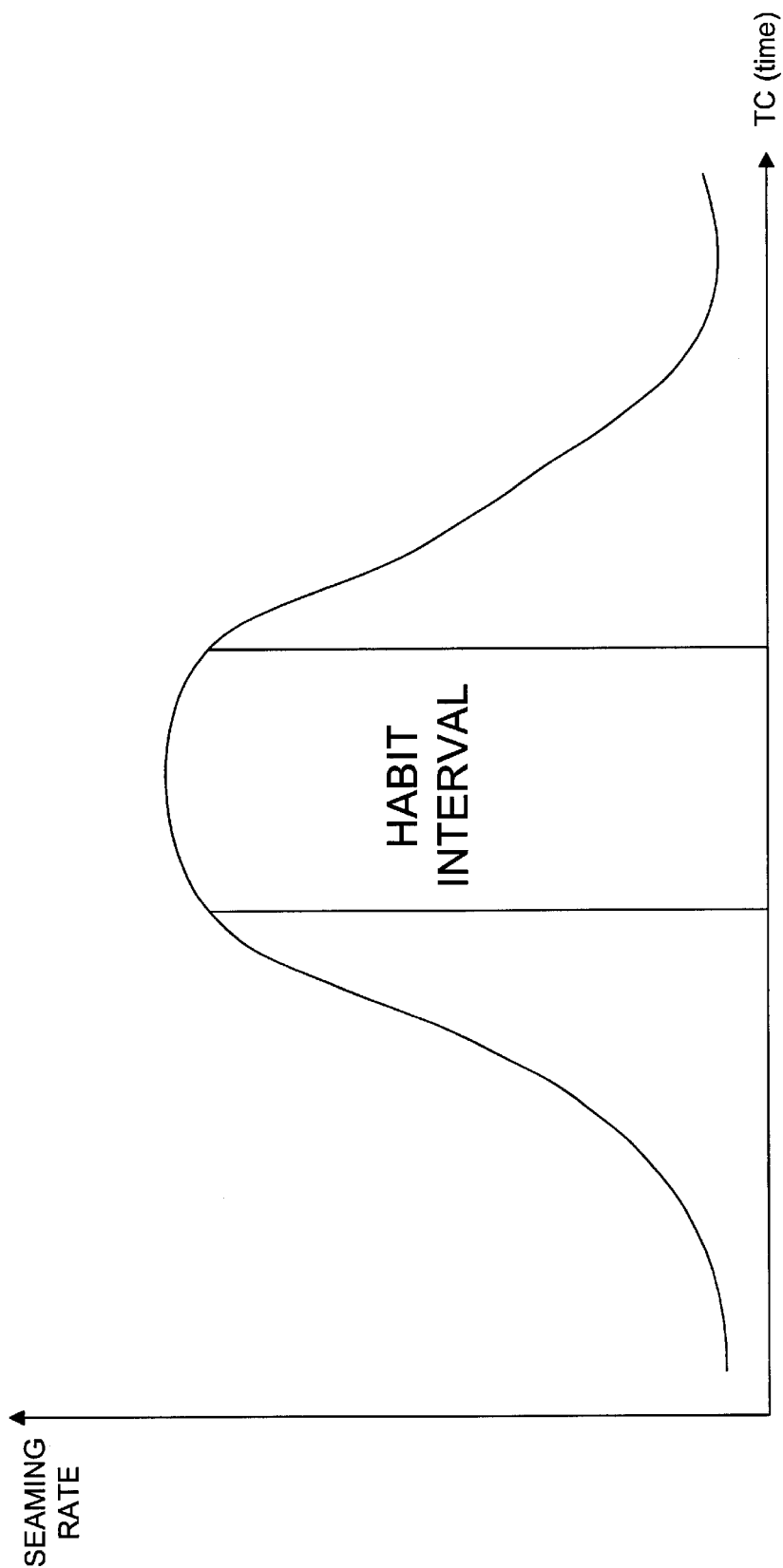
FIG. 9 is a diagram illustrating a learning function in accordance with one embodiment of the invention.

FIG. 9 charts the progress of the learning function's scan rate over time. The curve plotted as FIG. 9 is a bell-shaped curve whose central peak conforms to a habit interval at those times in the course of a subscriber's workweek or workday (or other regular time period) where the subscriber is most likely to be in the presence of a preferred network. During these times, the scan rate is adjusted upward. The independent axis in FIG. 9 represents a defining time period in the subscriber's life—i.e., a week or a day. The dependent axis in FIG. 9 plots scan rate, the scan frequency (actual or theoretical) given a subscriber habit interval. Thus, the scan rate can be higher for certain time intervals based on the habits of the subscriber.

A subscriber's commute to work usually occurs between a predictable, fixed range of hours or minutes. Therefore, as an example of habit profiling, consider a subscriber who commutes to work five days per week.

The learning function can establish a threshold habit frequency, above which a user's habit pattern must exceed in order for the scanning rate to be adjusted. As follows from this, if the learning function is designed to adjust the scanning rate scan for only those habits having frequency of sixty percent or higher, then the learning function will initiate a scan for our five-day-per-week commuter above according the the habits recorded on those days. This is because twenty out of thirty days, the days the subscriber travels to work, in the subscriber's work month equates to a two-thirds (67%) frequency. If on the other hand, a subscriber commutes to work only four days per week, then the same learning function, without modification or reprogramming, will not adjust the rate of scanning.

Because subscribers often have several daily or weekly habitual activities, the systems and methods for intelligent inter-system handoff contemplate development of a habit profile.

Figure 10A:
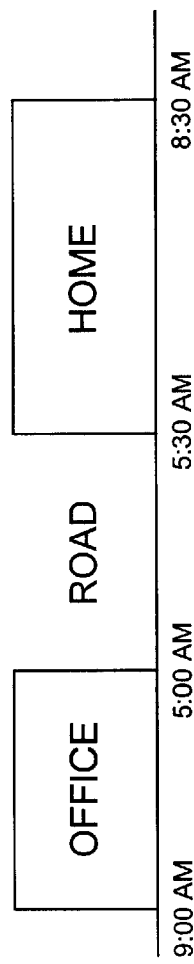
FIG. 10 is a diagram illustrating the formation of a hypothetical habit profile using the learning function of FIG. 9.

FIG. 10 represents a hypothetical habit profile for two representative mobile device subscribers: a banker and a taxicab driver. FIG. 10a portrays the daily routine of a typical banker who regularly arrives at the local branch office at 9:00 am and leaves the office daily at 5:00 pm; between 5:30 pm and 8:30 pm, the banker is at home. The banker predictably commutes between the hours of 5:00 pm and 5:30 pm, and 8:30 am and 9:00 am. The banker's predictable daily routine translates nicely into a habit profile.

Figure 10B:
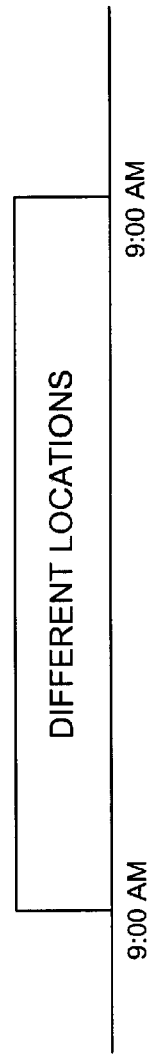

By contrast, the taxicab driver schedule of FIG. 10b is irregular, adding little value to the learning function. In situations with a high degree of predictability, such as the banker's habit profile, the systems and methods for intelligent inter-system handoff will adopt the habit profile into its scanning. In low predictability settings where a habit profile would be unhelpful, such as the taxi cab driver's habit profile, the search algorithm will consult the roaming table in a manner previously explained and not adjust the scanning based on the habit profile.

In another embodiment closely associated with subscriber habits, the systems and methods for intelligent inter-system handoff can be time-based. A calendar of prescheduled events is read from a data store that catalogs the time when certain events will occur. The mobile device performs predictive scanning triggered by one or more of these prescheduled events. For example, a scan may commence at 9:55 am, anticipating by five minutes a subscriber's scheduled off-site client meeting. An ability to map the subscriber's calendar of events to actual event locations would add a location-based enhancement, furthering predictability.

While embodiments and implementations of the invention have been shown and described, it should be apparent that many more embodiments and implementations are within the scope of the invention. Accordingly, the invention is not to be restricted, except in light of the claims and their equivalents.

What is claimed is:

1. A mobile device, comprising:
   a transceiver configured to tune to a first non-preferred carrier associated with a first network or a second preferred carrier associated with a second network;
   a table containing information related to the first and second networks;
   a learning function configured to construct a habit profile that relates certain periods of time to the availability of the second network, wherein the learning function only tracks habits with a frequency above a certain threshold, and
   a processor configured to:
   tune the transceiver to the first non-preferred carrier;
   register with the first network over the first carrier; and
   periodically attempt to tune the transceiver to the second preferred carrier only if the information in the table indicates that the mobile device may be within range of the second preferred carrier, wherein the period between attempts to tune the transceiver is influenced by the habit profile.

2. The mobile device of claim 1, wherein the table is loaded into the mobile device at the factory.

3. The mobile device of claim 1, wherein the table is loaded into the device by a network provider.

4. The mobile device of claim 1, wherein the table is loaded over the air.

5. The mobile device of claim 4, wherein the table is updated over the air.

6. The mobile device of claim 1, wherein the table is updated by the mobile device.

7. The mobile device of claim 1, wherein the table is constructed by the mobile device.

8. The mobile device of claim 1, wherein the table is uploaded from the Internet.

9. The mobile device of claim 1, wherein the periodic attempts to tune to the second preferred carrier are increased based on the habit profiles.

10. A mobile device, comprising:
    a transceiver configured to tune to a first non-preferred carrier associated with a first network or a second preferred carrier associated with a second network;
    a table containing information related to the first and second networks;
    a positioner configured to determine the position of the mobile device relative to the second network;
    a learning function configured to construct a habit profile that relates certain periods of time to the availability of the second network, wherein the learning function only tracks habits with a frequency above a certain threshold, and
    a processor configured to:
    tune the transceiver to the first non-preferred carrier;
    register with the first network over the first carrier; and
    periodically attempt to tune the transceiver to the second preferred carrier only if the information in the table indicates that the second network is present and the positioner determines that the mobile device is within range of the second preferred carrier, wherein the period between attempts to tune the transceiver is influenced by the habit profile.

11. The mobile device of claim 10, wherein the positioner can use an RSSI or bit error determination when determining the position of the mobile device relative to the second network.

12. The mobile device of claim 10, wherein the positioner is a GPS receiver.

13. The mobile device of claim 10, wherein the positioner uses time of arrival, angle of arrival, or beam forming techniques.

14. The mobile device of claim 10, wherein the table includes, in whole or in part, information related to the position of the second network.

15. A mobile device, comprising:
    a transceiver configured to tune to a first non-preferred carrier associated with a first network or a second preferred carrier associated with a second network;
    a learning function configured to construct a habit profile that relates certain periods of time to the availability of the second network; and
    a processor configured to:
    tune the transceiver to the first non-preferred carrier;
    register with the first network over the first carrier; and
    periodically attempt to tune the transceiver to the second preferred carrier based on the habit profile;
    wherein the learning function only tracks habits with a frequency above a certain threshold.

16. The mobile device of claim 15, where in the period between attempts to tune the transceiver is influenced by the habit profile.

17. The mobile device of claim 16, wherein the periodic attempts to tune to the second preferred carrier are increased based on the habit profile.

18. A mobile device, comprising:
    a transceiver configured to tune to a first non-preferred carrier associated with a first network or a second preferred carrier associated with a second network;

a scheduler configured to store the information about certain events; and a learning function configured to construct a habit profile that relates certain periods of time to the availability of the second network, wherein the learning function only tracks habits with a frequency above a certain threshold, and a processor configured to:
  tune the transceiver to the first non-preferred carrier;
  register with the first network over the first carrier; and
  periodically attempt to tune the transceiver to the second preferred carrier based on the information stored in the scheduler, wherein the period between attempts to tune the transceiver is influenced by the habit profile.

19. A wireless communication network, comprising:

a table containing information related to a preferred wireless communication network; and a plurality of mobile devices, each mobile device comprising:
  a transceiver configured to tune to a first non-preferred carrier associated with the wireless communication network or a second preferred carrier associated with the preferred wireless communication network;
  a learning function configured to construct a habit profile that relates certain periods of time to the availability of the second network, wherein the learning function only tracks habits with a frequency above a certain threshold, and
  a processor configured to:
    tune the transceiver to the first non-preferred carrier;
    register with the first network over the first carrier; and
    periodically attempt to tune the transceiver to the second preferred carrier only if the information in the table indicates that the mobile device may be within range of the second preferred carrier, wherein the period between attempts to tune the transceiver is influenced by the habit profile.

20. The wireless communication network of claim 19, wherein each of the plurality of mobile devices further comprises a positioner, and wherein the processor periodically attempts to tune the transceiver to the second preferred carrier only if the information in the table indicates that the second network is present and the positioner determines that the mobile device is within range of the second preferred carrier.

21. The wireless communication network of claim 19, wherein the habit profile relates certain periods of time to the availability of the preferred wireless communication network, and wherein the processor periodically attempts to tune the transceiver to the second preferred carrier based on the habit profile.

22. The wireless communication network of claim 19, wherein each of the plurality of devices further comprises a scheduler configured to store information related to certain events, and wherein the processor periodically attempts to tune the transceiver to the second preferred carrier based on the information stored in the scheduler.

23. A mobile device, comprising:

a transceiving means for tuning to a first non-preferred carrier associated with a first network or a second preferred carrier associated with a second network;

a storage means for storing a table containing information related to the first and second networks;

a learning function configured to construct a habit profile that relates certain periods of time to the availability of the second network, wherein the learning function only tracks habits with a frequency above a certain threshold, and a processing means for:
  tuning the transceiving means to the first non-preferred carrier;
  registering with the first network over the first carrier; and
  periodically attempting to tune the transceiving means to the second preferred carrier only if the information in the table indicates that the mobile device may be within range of the second preferred carrier, wherein the period between attempts to tune the transceiver is influenced by the habit profile.

24. The mobile device of claim 23, further comprising a positioning means for determining the position of the mobile device relative to the second network, and wherein the processing means periodically attempts to tune the transceiver to the second preferred carrier based on the position determined by the positioning means.

25. The mobile device of claim 23, wherein the periodic attempts to tune to the second preferred carrier are increased based on the habit profile.

26. A wireless communication network, comprising:

a plurality of mobile devices, each mobile device comprising:
  a transceiver configured to tune to a first non-preferred carrier associated with the wireless communication network or a second preferred carrier associated with the preferred wireless communication network;
  a learning function configured to construct a habit profile that relates certain periods of time to the availability of the second network, wherein the learning function only tracks habits with a frequency above a certain threshold, and
  a processor configured to:
    tune the transceiver to the first non-preferred carrier;
    register with the first network over the first carrier; and
    periodically attempt to tune the transceiver to the second preferred carrier whenever the wireless communication network sends a command to the mobile device instructing the mobile device to scan for the preferred wireless communication network, wherein the period between attempts to tune the transceiver is influenced by the habit profile.

* * * * *